United States Patent [19]

Ando et al.

[11] Patent Number: 4,601,652

[45] Date of Patent: Jul. 22, 1986

[54] APPARATUS FOR PRODUCING A MOLDED SKIN PRODUCT

[75] Inventors: Yoshio Ando, Kawagoe; Shuno Kumagai, Sayama; Toshiyuki Kinugasa, Hidaka, all of Japan

[73] Assignee: Honda Giken Kogyo Kabushiki Kaisha, Japan

[21] Appl. No.: 770,485

[22] Filed: Aug. 29, 1985

Related U.S. Application Data

[62] Division of Ser. No. 494,103, May 12, 1983, Pat. No. 4,552,715.

[30] Foreign Application Priority Data

May 12, 1982 [JP] Japan .................. 57-78195

[51] Int. Cl.⁴ ................ B29C 41/38; B29C 41/46
[52] U.S. Cl. ................ 425/447; 425/DIG. 20
[58] Field of Search .............. 425/90, 143, 183, 447, 425/407, DIG. 20

[56] References Cited

U.S. PATENT DOCUMENTS

| | | | |
|---|---|---|---|
| 3,002,231 | 10/1961 | Walker et al. | 264/DIG. 51 |
| 3,452,124 | 6/1969 | Knapp | 425/407 |
| 3,478,387 | 11/1969 | Ruekberg | 425/407 |
| 3,880,968 | 8/1975 | Kaspar et al. | 264/DIG. 51 |
| 3,927,161 | 12/1975 | Powell et al. | 264/309 |
| 3,947,165 | 3/1976 | Szatkowski | 264/309 |
| 4,240,780 | 12/1980 | Carcey | 425/407 |

FOREIGN PATENT DOCUMENTS

| | | | |
|---|---|---|---|
| 236261 | 11/1961 | Australia | 425/DIG. 20 |
| 1359843 | 3/1963 | France | 264/51 |
| 55-28858 | 7/1980 | Japan . | |

*Primary Examiner*—Willard E. Hoag
*Attorney, Agent, or Firm*—Armstrong, Nikaido, Marmelstein & Kubovcik

[57] ABSTRACT

A process and an apparatus for producing a molded skin product such as an interior decoration member like an instrument panel for an automobile or other vehicle. The process includes charging a desired amount of synthetic resin powder into a treating container disposed facing a predetermined shaped molding mold surface. The mold surface is heated to a temperature of at least the melting temperature of the synthetic resin. The powder is spattered onto the mold surface by violently agitating the same by an agitation means whereby a fused coating of the powder is formed on the mold surface. The spattering is discontinued when the coating reaches a predetermined thickness. The mold surface is cooled thereby solidifying the coating to form the molded skin material. The molded skin material is then removed from the mold surface. The powder can be fluidized during the spattering. The apparatus includes the treating chamber for receiving a charge of synthetic resin powder, a metallic mold forming with the treating chamber a closed chamber with the mold having a mold surface facing the treating chamber, equipment for selectively heating and cooling the mold surface, and an agitation mechanism in the treating chamber for violently agitating the synthetic resin powder to spatter the same upwardly against the mold surface. The mold can be moveable from a closed position forming the closed chamber to an open position with the mold surface facing upwardly. The agitation mechanism includes at least one shaft and agitation blades mounted thereon.

17 Claims, 2 Drawing Figures

APPARATUS FOR PRODUCING A MOLDED SKIN PRODUCT

This application is a divisional application of Ser. No. 494,103 filed May 12, 1983, now U.S. Pat No. 4,552,715.

BACKGROUND OF THE INVENTION

This invention relates to a manufacturing process and a manufacturing apparatus of a molded skin material used for an interior decoration member for a vehicle such as a motorcar or the like.

Molded skin materials used for an automobile or other vehicle interior decoration member such as an instrument panel, a door panel and so on, generally have a complicated curved surface. Additionally, such materials can have any desired pattern thereon such as seams, specific formed wrinkles or the like. A conventional manufacturing process comprises charging a plastic sol into a mold having a predetermined curved shape and/or a pattern. An alternative previous method is known as slush molding. Plastic powder is coated on a predetermined shaped molding mold surface by electrodeposition coating and the coating is then fused by heating so that a film thereof is formed thereon. The former process is defective in that air is liable to be confined to the contact surface between the charged liquid and the mold, thereby producing bubbles or voids and pinholes are liable to be created in the molded film due to the air included in the liquid. The latter process is defective in that, because the powder is coated on the surface after it is charged with electricity, the flowing rate and the flowing amount of the powder from a gun are limited, resulting in lowering the coating efficiency. This is especially so when a comparatively large-sized and complicated molded product is to be manufactured. The problem is that it is difficult to coat on every sideward and rearward part of the curved mold surface. Therefore, it is inevitable for this process to provide a multiple head type gun apparatus wherein a large number of guns are disposed at various necessary angles in relation to the molded surface.

OBJECTS AND SUMMARY OF THE INVENTION

It is an object of the present invention to provide a process for production of a molded skin material in which air bubbles, voids, and pinholes are avoided in the final molded skin material.

It is another object of the present invention to provide a process for producing a molded skin material which is uniform in thickness.

It is yet another object of the present invention to provide a process for producing a molded skin material which is highly efficient and simple to conduct.

It is a further object of the present invention to provide an apparatus which is simple and efficient for producing a molded skin material.

It is a still further object of the present invention to provide an apparatus for producing a molded skin material which reduces the possibilities of air bubbles, voids or pinholes in the final product.

It is a yet further object of the present invention to provide an apparatus for producing a molded skin material in which the final product has uniform thickness.

These and other objects are obtained in a process for producing a molded skin material wherein a desired amount of synthetic resin powder is charged into a treating container disposed facing a predetermined shaped molding mold surface. The mold surface is heated to a temperature of at least the melting temperature of the synthetic resin. The powder is spattered onto the mold surface by violently agitating the same by an agitation means whereby a fused coating of the powder is formed on the mold surface. The spattering is discontinued when the coating reaches a predetermined thickness. The mold surface is then cooled thereby solidifying the coating to form the molded skin material. The molded skin material is thereafter removed from the mold surface. During the spattering, the powder can be fluidized.

The apparatus of the present invention comprises a treating container having a lower portion with a space therein for receiving a charge of synthetic resin powder and metallic mold forming with the treating container a closed chamber, means for selectively heating and cooling a mold surface of the mold which faces the treating container, and agitation means in the treating container for violently agitating the synthetic resin powder. The agitation means spatters the powder upwardly against the mold surface. The mold is moveable from a closed position forming a closed chamber with the treating container and an open position with the mold surface facing upwardly. The agitation means can include at least one shaft and agitation blades mounted thereon.

The at least one shaft can be mounted horizontally and can carry thereon a plurality of agitation blades disposed axially at predetermined intervals therealong. The agitation means can further comprise means for rotationally driving the at least one shaft selectively in either direction.

The agitation means can comprise a plurality of shafts, each with a lurality of blades thereon and means for rotationally driving each of the plurality of shafts selectively in either direction. A means for moving the at least one shaft axially can be provided. Furtherr, a means for tilting the at least one shaft relative to the molding surface can be provided. The apparatus can further comprise means associated with the lower portion of the treating container for fluidizing the synthetic resin powder therein.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE INVENTION

Figure 1:
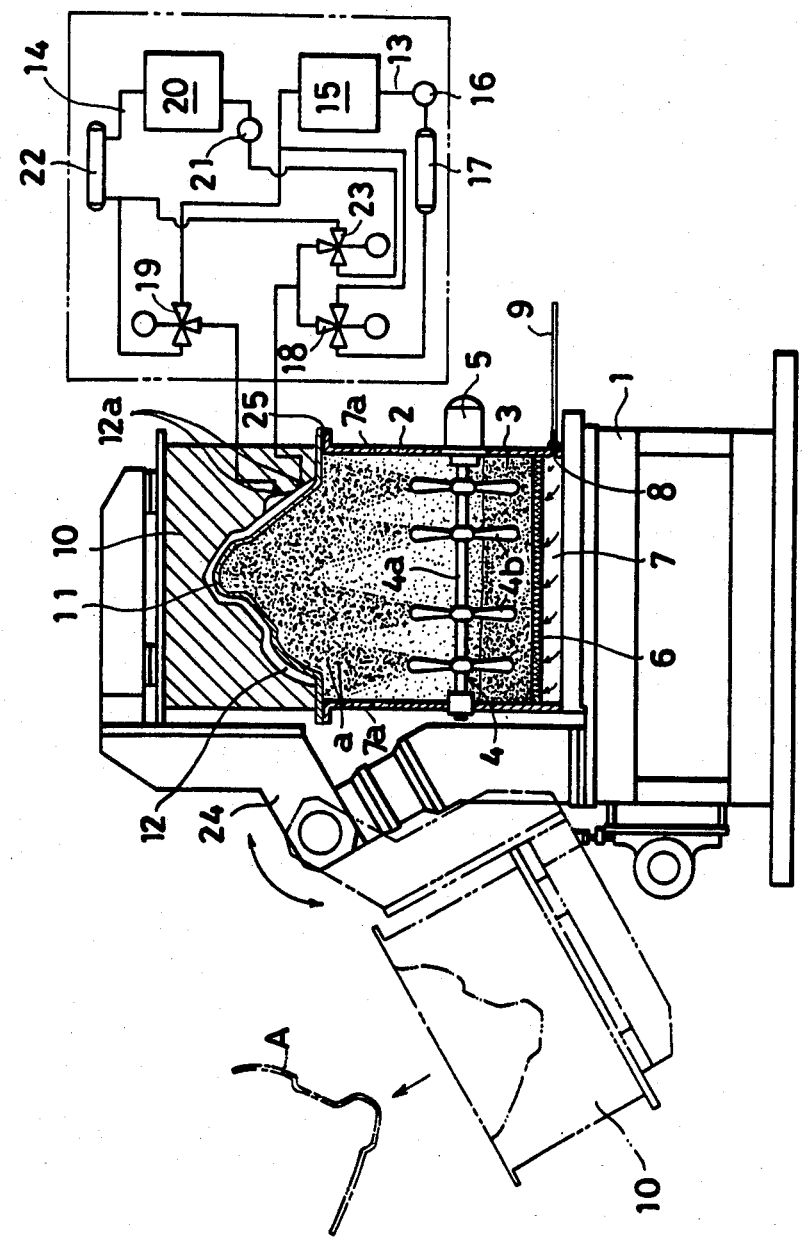
FIG. 1 is a side view, partly in section, of one example of this invention apparatus.

Embodying examples of this invention will now be explained with reference to the accompanying drawings:

Referring to FIG. 1 showing one example thereof, a machine base 1 is fixedly provided with a treating container 2 thereon which has a predetermined depth and is open at its upper surface. A lower portion space 3 of the container 2 is charged with synthetic resin powder which comprises a large number of fine particles a in the range of 30–200μ in particle diameter. A rotary agitator 4 is horizontally provided in this lower portion space 3 including the charged layer of synthetic resin powder. More in detail, a rotary shaft 4a thereof is placed horizontally with both end portions thereof supported through bearings on mutually opposite side walls of the treating container 2. The shaft 4a has agitation blade means thereon which comprises a number of agitation groups each comprising radially extending agitation blades 4b. The agitation groups are disposed on the shaft 4a at predetermined intervals along the axial direction thereof. At least one such agitator 4, and usually plural ones thereof are provided side by side, that is, in parallel one with another. An agitation motor 5 is connected to them. Means are provided for reversing rotation direction of the various shafts. A bottom wall of the treating container 2 is composed of an air-permeable wall 6 such as an air filter or the like having innumerable fine holes and made of glass, fabric or the like. An air chamber 7 is provided below the wall 6. The chamber 7 is so arranged that compressed air may be introduced thereinto through an air supply opening 8 made in the side wall of the chamber 7 and an air supply pipe 9 connected to the opening 8. In this manner, the foregoing synthetic resin layer may be fluidized or brought into a floating condition by the supplied air passing through the bottom wall 6. A meshed window 7a is provided for air discharging. The upper surface of the treating container 2 is provided with a metallic mold 10 covering, that is, closing the same. The metallic mold 10 is provided with a downwardly directed molding mold surface 11 having a predetermined complicated curved molding shape and additionally, as an occasion demands, a wrinkle pattern or the like formed thereon. There is provided on the rear surface of the molding mold surface 11 a temperature adjusting jacket 12 into which a heating medium and a cooling medium may be introduced alternately for effecting heating and cooling, alternately, of the whole area of the surface 11. The jacket 12 is selectively connected through two communication openings 12a, 12a to a circuit 13 for the heating medium and a circuit 14 for the cooling medium. More in detail, the circuit 13 for the heating medium such as oil, water or the like, includes a tank 15, a pump 16, a heater 17, a three-way valve 18 on one side, and a three-way valve 19 on the other side, is connected through the foregoing communication openings 12a, 12a to the foregoing jacket 12 for circulation supply of the heating medium. The circuit 14 for the cooling medium such as oil, water or the like, includes a tank 20, a pump 21, a cooler 22, the foregoing three-way valve 19 and an additional three-way valve 23, and is connected through the foregoing communication openings 12a, 12a to the foregoing jacket 12 for circulation supply of the cooling medium.

For heating the temperature adjusting jacket 12, the heating medium from the tank 15 is pumped into the jacket 12 via the pump 16, heater 17, three-way valve 18 and a communication opeining 12a of the jacket 12, and flows out of the jacket 12 via the other communication opening 12a and the three-way valve 19 to the tank 15 to complete the cycle of circulation of the heating medium, during which time the circuit 14 for circulation of the cooling medium is closed off from communication with the jacket 12 by three-way valve 23 while the cooling medium circuit 14 is maintained in closed circulation. For cooling the jacket 12, the cooling medium circuit 14 operates in similar manner, and the cooling medium is pumped into the jacket 12 via the pump 21, three-way valve 23 and a communication opening 12a of the jacket 12, and flows out of the jacket 12 via the other communication opening 12a and the three-way valve 19 through the cooler 22 to the tank 20 to complete the cycle of circulation of the cooling medium, during which time the heating medium circuit 13 is closed off from communication with the jacket 12 by the three-way valve 18 while the heating medium circuit 13 is maintained in closed circulation.

A circuit connecting between the cooler 22 and the three-way valve 23 can serve for heightening the cooling or heating efficiency. Namely, when the metallic mold 10 is to be changed from heating to cooling, if the hot oil in the mold 10 is returned to the tank 20 for the cooling medium, the efficiency becomes bad. Acccordingly, the foregoing circuit is used in this case for returning the hot oil to the tank 15 for the heating medium, and immediately thereafter the circuit is changed over to the cooling cycle. This is similarly applicable to the case that the circuit is changed over from the cooling cycle to the heating cycle.

The metallic mold 10 is so arranged that, by turning of an opening and closing mechanism 24 attached to the side surface thereof, the same can be turned over to an open position wherein the molding mold surface 11 thereof is directed upwards as shown by chain lines, so that after the completion of the molding operation, the molding mold surface 11 of the mold 10 may be directed upwards and thereby taking out of the produce A may be facilitated. It is preferable that an air-tight sealing member 25 such as a packing or the like is provided on the periphery of the molding mold surface 11 of the metallic mold 10.

Next, a manufacturing process of this invention using the foregoing example of this invention apparatus will be explained as follows:

A desired amount of synthetic resin powder a is charged into the treating container 2, and the metallic mold 10 is turned to close the treating container 2 by turning the opening and closing mechanism 24. Under this condition, the air chamber 7 at the bottom portion of the treating container 2 is supplied with air. The air flows thereinto through the bottom wall 6 so as to fluidize the charged layer of synthetic resin into its flowing and floating condition. In the meanwhile, the jacket 12 of the metallic mold 10 is supplied with the heating medium such as oil or the like heated to a temperature above the melting point of the synthetic resin powder a. In this manner, the molding mold surface 11 thereof is heated to a predetermined temperature. Under this condition, the agitator 4 is driven to rotate so that the large number of the disposed blade 4b groups are rotated violently at a high speed. The floating synthetic resin powder layer is driven by the blades 46 to continuously, upwardly spatter. By this operation, the fine particles of the synthetic resin powder a are forced to impinge strongly against the surface of the heated molding mold surface 11 directed downwardly and located over the floating resin powder and are fused on the surface 11 by the heat thereof. As a result, there is obtained a fused and firmly deposited layer of the synthetic resin powder without any air being confined between the same and the molding mold surface 11. Similarly, in sequence, fine particles of the synthetic resin powder are forcedly accumulated on and are fused to the foregoing heated fused resin layer. If upward spattering of the resin powder by the agitator is continued for 30-120 seconds, there is produced a sheet of fused and molded resin coat of about 0.5-2 mms in thickness.

If the rotation of the agitator is reversed in the midst of the operation and accordingly the rotation of the agitation blades are reversed, the direction of the spattered resin powder toward the mold surface 11 is varied and a uniform and accurate layer forming in conformity with the curved shape of the mold surface can be ensured. It is preferrable that the regular rotation and the reverse rotation of the agitator are repeated 2-3 times. It is further preferrable that the uniform coating property is more improved by such a manner that one of the two agitators, for instance, disposed in parallel one with another is rotated in regular direction while the remaining one is rotated in the reverse direction so as to create a turbulent flow of powder. When the thickness of the resin layer reaches a desired amount, the rotation of the agitator and the supply of the air are stopped, and the fused resin layer is kept at a predetermined temperature in order to ensure a uniform film forming treatment thereof. Thereafter, the supply of the heating medium into the jacket 12 is stopped, and the predetermined three-way valves are changed over to the cooling circuit side, whereby the cooling medium is supplied into the jacket 12 to cool the molding mold surface 11 for solidifying the resin layer. Thus, the molded skin material A of the predetermined thickness may be produced.

Thereafter, the opening and closing mechanism 24 is operated, and thereby the metallic mold 10 is turned over so that the molding mold surface 11 is opened, and accordingly the molded product A is turned to face upwardly. As a result, the product A can be easily taken out. The agitator 4 can be arranged so that the same may be shifted left or right to a predetermined position in the axial direction of the shaft and/or arranged so that the shaft 4a thereof may be inclined in relation to the mold surface 11, whereby a uniform adhesion of the synthetic resin powder to the molding mold surface is more improved.

Figure 2:
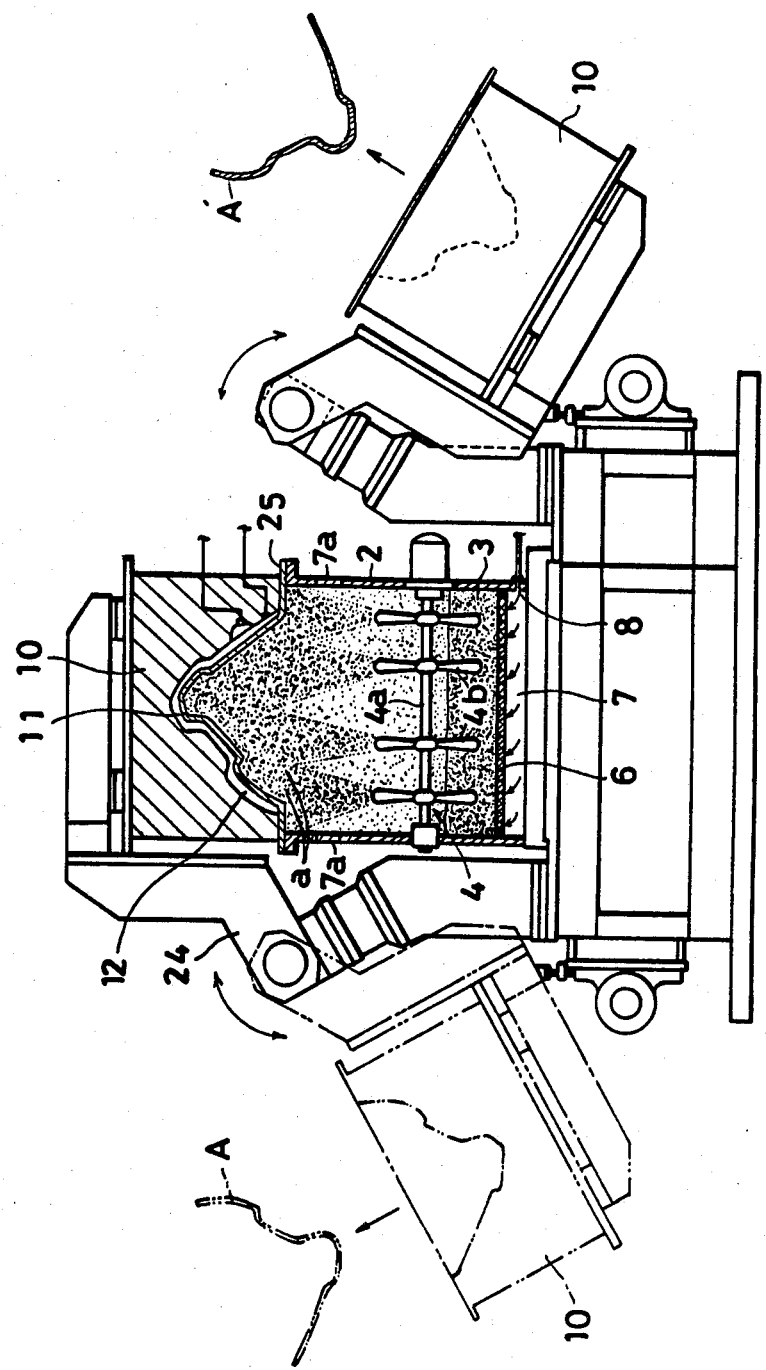
FIG. 2 is a side view of another embodying example thereof.

If the metallic mold 10 which is turnable through the opening and closing mechanism 24 is provided on each of both sides of the treatment container 2 as shown in FIG. 2, a manufacturing procedure becomes possible wherein while one of the metallic molds 10, 10 is positioned on the upper surface of the container 2 for closing the same and the molding mold surface 11 thereof is heated to form thereon a fused molded film, the other thereof is turned over and the fused molded coat previously formed thereon is solidified by cooling and is taken out therefrom. This procedure can be repeated alternately, so that it is advantageous in that a number of the skin material products A can be manufactured continuously and at a high efficiency.

Concrete Example

Vinyl chloride resin powder which is in a range of about 30-200μ in particle diameter, and, for instance, is 150μ in average particle diameter alone, or a powder of a composition composed of 100 parts thereof, 70-80 parts of a plasticizer, 1-5 parts of a stabilizer, 1-5 parts of a pigment and 1-2 parts of an additive is used as the raw material. The metallic mold is previously heated to a temperature of 230° C.

The foregoing raw material powder is brought into a fluidized condition by the inflow of air and is agitated and spattered on the mold surface for 60 seconds by the agitator being repeatedly turned in a regular direction and in the reverse direction alternately at a rotation speed of 1200 r.p.m. so that a uniformly fused layer of the powder is formed. Thereafter, the alternate turning of the agitator is stopped and the supply of the air is also stopped. The metallic mold is kept at a temperature of 230° C. for 120 seconds, whereby the fused resin layer is so matured on the mold surface as to be smooth in surface and uniform in thickness. Thereafter, the metallic mold is cooled, and the temperature thereof is lowered to 80° C. in 120 seconds, whereby the fused resin coat is solidified and thus the manufacturing thereof is completed. Consequently, there is obtained a predetermined form of mold skin material which has a uniform thickness of about 1.2 mms and is composed solely or chiefly of vinyl chloride and has at its surface a wrinkle pattern.

In a case where the foregoing vinyl chloride skin material produced by this invention is used as the raw material for manufacturing an interior decoration member for a vehicle such as a motorcar or the like, the process for instance, can include separately preparing a core sheet member of ABS resin by a conventional process, setting the core in one of two molds facing one another, setting the product of the present invention set in the other thereof, charging the urethane foam liquid between the two. The foam is then cured and an interior decoration member having at its surface this invention skin material layer is produced.

Thus, according to this invention, the synthetic resin powder charged in the treating container is violently spattered, impinged, and fused on the whole area of the heated molding mold surface, so that a good quality of molded skin material is formed accurately according to the shape of the predetermined shaped molding surface. This product is free from air bubbles, voids, and pinholes and can be produced in a short time. The productivity thereof can be improved.

It is readily apparent that the above-described method and apparatus meets all of the objects mentioned above and also has the advantage of wide commerical utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for producing a molded skin material comprising:
   a treating container having a lower portion provided with a space therein for receiving a charge of synthetic resin powder,
   a metallic mold forming with said treating container a closed chamber, said mold having a molding mold surface facing said treating container, said mold being movable to and from a closed position with said mold surface facing downwardly for forming with said treating container said closed chamber and an open position with said mold surface facing upwardly,
   means for selectively heating and cooling said mold surface, and
   agitation means provided in said treating container for violently agitating the synthetic resin powder charged in said treating container to spatter the same upwardly against said mold surface, said agitation means including at least one shaft having agitation blades mounted thereon.

2. The apparatus of claim 1, wherein said at least one shaft is mounted horizontally and carries thereon a plurality of agitation blades disposed at predetermined axial intervals therealong.

3. The apparatus of claim 2 wherein said agitation means further includes means for rotationally driving said at least one shaft selectively in either direction.

4. The apparatus of claim 1 wherein said agitation means comprises a plurality of shafts each with a plurality of blades thereon and means for rotationally driving each of said plurality of shafts selectively in either direction.

5. The apparatus of claim 1 further comprising means for moving said at least one shaft axially.

6. The apparatus of claim 2 further comprising means for moving said at least one shaft axially.

7. The apparatus of claim 1 further comprising means for tilting said at least one shaft relative to said molding surface.

8. The apparatus of claim 2 further comprising means for tilting said at least one shaft relative to said molding surface.

9. The apparatus of claim 3 further comprising means for tilting said at least one shaft relative to said molding surface.

10. The apparatus of claim 1 further comprising means associated with said lower portion of said treating container for fluidizing said synthetic resin powder therein.

11. The apparatus of claim 1, wherein said movable metallic mold is made turnable between said closed and open positions thereof through an opening and closing mechanism provided on a side of said treating container.

12. The apparatus of claim 1, wherein a pair of said movable metallic molds are provided, each said mold being made turnable between said closed and open positions thereof through a corresponding one of a pair of opening and closing mechanisms provided on respective sides of said treating container.

13. The apparatus of claim 1, wherein said means for selectively heating and cooling said mold surface comprises a temperature adjusting jacket provided on a rear surface of said metallic mold into which a heating medium and a cooling medium may be introduced alternately for effecting heating and cooling, alternately, of the entire mold surface.

14. The apparatus of claim 13, wherein said means for selectively heating and cooling said mold surface further comprises at least two communication openings in said temperature adjusting jacket which may be selectively placed in communication with a circuit for said heating medium and a circuit for said cooling medium.

15. The apparatus of claim 1, wherein said means for selectively heating and cooling said mold surface comprise:
a temperature adjusting jacket provided on a rear surface of said metallic mold into which a heating medium and a cooling medium may be introduced alternately for effecting heating and cooling, alternately, of the whole area of said mold surface;
heating circuit means for heating and circulating said heating medium;
cooling circuit means for cooling and circulating said cooling medium;
at least two communication openings provided in said temperature adjusting jacket in communication therewith; and
means for selectively communicating said heating circuit means and said cooling circuit means with said communication openings.

16. The apparatus of claim 15, wherein said heating circuit means includes a first tank, a first pump in communication with said first tank, a heater in communication with said first pump, a first three-way valve in communication with said heater and selectively communicable with one of said communication openings and said first tank, and a second three-way valve in communication with another of said communication openings and selectively communicable with said first tank;
and wherein said cooling circuit means includes a second tank, a second pump in communication with said second tank, a third three-way valve in communication with said second pump and selectively communicable with said one of said communication openings and a cooler, said cooler being in communication also with said second tank, and said second three-way valve in communication with said other of said communication openings and selectively communicable with said cooler.

17. The apparatus of claim 15, further comprising circuit means connecting between said cooler and said third three-way valve for heightening the heating and cooling efficiency of said means for selectively heating and cooling said mold surface.

* * * * *